United States Patent [19]

Yamashita

[11] 4,230,516

[45] Oct. 28, 1980

[54] LABELLING MACHINE

[75] Inventor: Kyoichi Yamashita, Yokohama, Japan

[73] Assignee: Koyo Jidoki Co., Ltd., Kanagawa, Japan

[21] Appl. No.: 22,489

[22] Filed: Mar. 21, 1979

[30] Foreign Application Priority Data

Oct. 24, 1978 [JP] Japan ................................ 53/129976

[51] Int. Cl.$^2$ ......................... B32B 31/00; B65C 9/00; B65C 7/00

[52] U.S. Cl. ..................................... 156/364; 156/567; 156/571

[58] Field of Search ................ 156/571, 567, 360, 364

[56] References Cited

U.S. PATENT DOCUMENTS

| | | | |
|---|---|---|---|
| 2,318,215 | 5/1943 | Gans | 156/571 |
| 3,322,597 | 5/1967 | Vite | 156/571 |
| 3,528,871 | 9/1970 | Munch | 156/571 |
| 3,537,934 | 11/1970 | Munch | 156/571 |

*Primary Examiner*—Douglas J. Drummond

*Attorney, Agent, or Firm*—Armstrong, Nikaido, Marmelstein & Kubovcik

[57] ABSTRACT

A labelling machine which includes a plurality of label suction drums rotatably mounted on a bed plate and a plurality of label holders for supplying labels one-by-one to a corresponding label suction drum. A label applicator drum is positioned adjacent to the label suction drums for receiving labels carried by the label suction drums, and thereafter applying the labels to an object which may have either an arcuate or a planar surface. Each label suction drum is provided with a plurality of arcuately spaced projections and vacuum suction outlets between the projections. The labels are retained on a peripheral surface of each label suction drum between the projections by a vacuum applied through the vacuum suction outlets. An upper stop element is positioned adjacent the periphery of each label suction drum and the label applicator drum. The upper stop element, which is spaced from the bedplate by a distance corresponding to the height of the labels, corrects any horizontal misalignment of the labels relative to the label suction drum. A push mechanism urges the labels carried by the label suction drums towards the label applicator drum.

4 Claims, 9 Drawing Figures

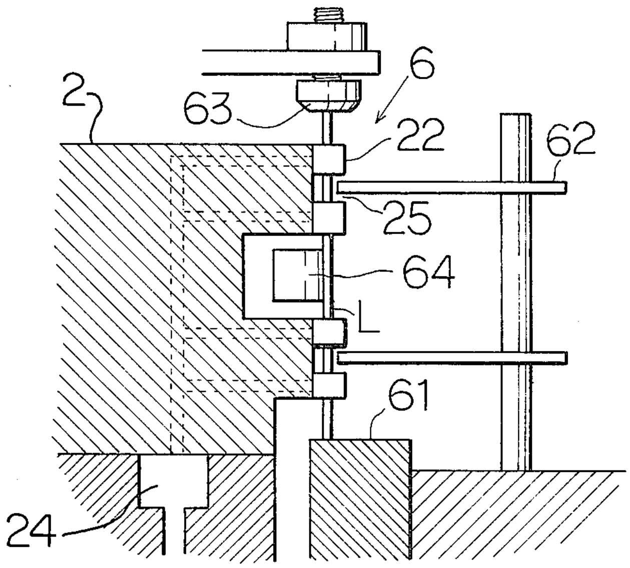
FIG. 6
FIG. 7
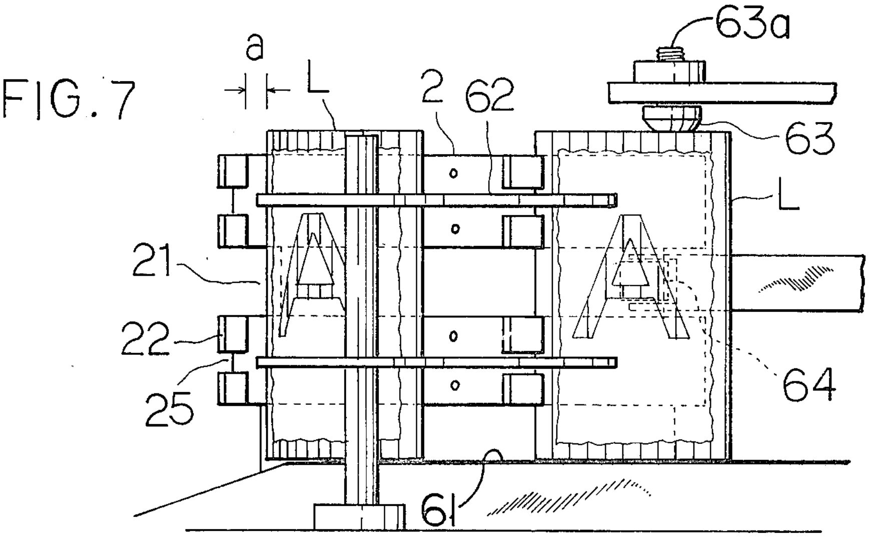
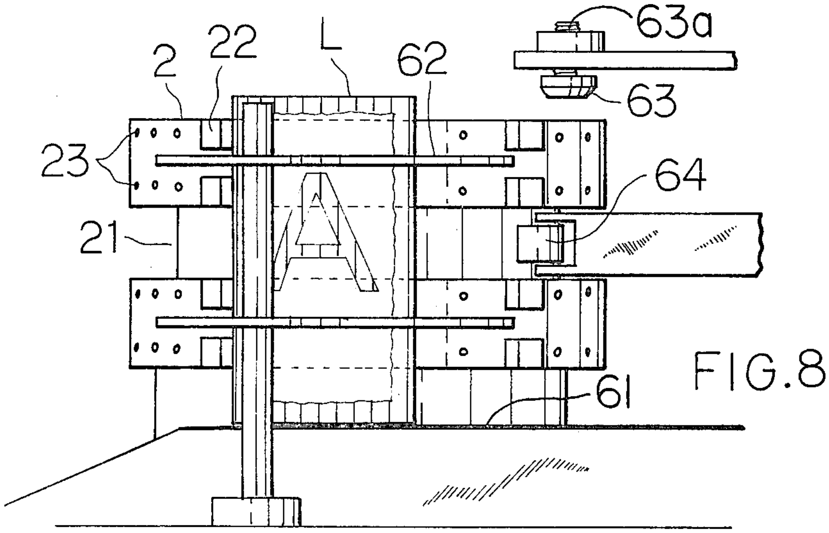
FIG. 8

LABELLING MACHINE

BACKGROUND OF THE INVENTION

1. Field of the Invention

The present invention relates to a labelling machine which sticks a label on the external surface of an object having a planar or a curved surface, such as a bottle, a can, a paper cylindrical container, a recording tape cassette, etc (hereinafter referred to as a container).

2 Description of the Prior Art

The inventor of the device of the present application has already filed Japanese patent application No. 31403/76, Patent Laid-Open No. 115200/1977, for an invention relating to a labelling machine having improved labelling speed. The invention is characterized by an idea in which each label flies after being released from the label suction drum, until it is received by a label receiving member before it is urged against a container.

SUMMARY OF THE INVENTION

The present invention relates to a further improvement in labelling machines, which is accomplished based on another idea to remove the aforementioned disadvantages. An object of the present invention is to provide a labelling machine having an improved labelling speed, even when using a prior art label suction drum.

Labels tend to deviate from a horizontal position during the period in which they are taken by a label suction drum or during the period in which they are transferred from the surface of one drum to another. Such a tendency reduces, or even spoils, the commodity value of a container which has been struck with a label, particularly in the case where the label is long enough to fully encircle a cylindrical container.

Accordingly, another object of the present invention is to provide a labelling machine capable of sticking labels in an exact horizontal position around the external surface of a container.

The present invention is directed to a labelling machine which includes a plurality of label suction drums rotatably mounted on a bed plate and a plurality of label holders for supplying labels one-by-one to a corresponding label suction drum. A label applicator drum is positioned adjacent to the label suction drums for receiving labels carried by the label suction drums, and thereafter applying the labels to an object which may have either an arcuate or a planar surface. Each label suction drum is provided with a plurality of arcuately spaced projections and vacuum suction outlets between the projections. The labels are retained on a peripheral surface of each label suction drum between the projections by a vacuum applied through the vacuum suction outlets. An upper stop element is positioned adjacent the periphery of each label suction drum and the label applicator drum. The upper stop element, which is spaced from the bedplate by a distance corresponding to the height of the labels, corrects any horizontal misalignment of the labels relative to the label suction drum. A push mechanism urges the labels carried by the label suction drums towards the label applicator drum.

BRIEF DESCRIPTION OF THE DRAWINGS

These and other objects and advantages of the invention will become more fully apparent as the following description is read in conjunction with the drawings wherein:

FIG. 6 is a vertical sectional view of a portion of the label suction drum illustrated in FIG. 5;

FIGS. 7 and 8 are schematic views illustrating the procedure in which a label is transferred from the label suction drum to the label applicator drum.

DESCRIPTION OF THE PREFERRED EMBODIMENT

Figure 1:
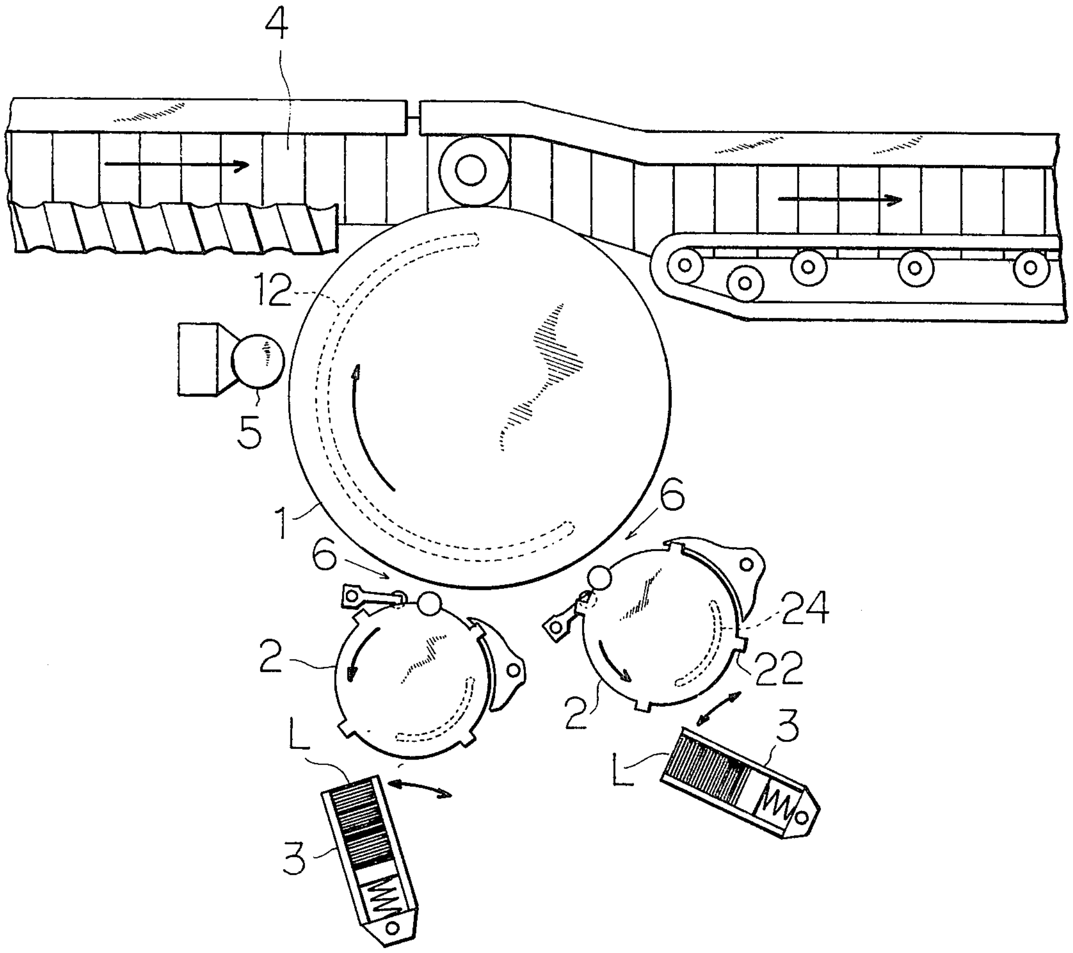
FIG. 1 is an overall plan view of a labelling machine in accordance with the present invention.

A label applicator drum 1 rotates in the center of a labelling machine. A plurality of label suction drums 2 are arranged around the label application drum 1. A label holder 3 is positioned adjacent to each label suction drum 2. The label holders 3 are permitted a horizontal swing motion. A paste application drum 5 is arranged between the last one of the label suction drums 2 and the container to apply paste to the labels. A conveyor 4 is positioned adjacent to the label applicator drum 1 for conveying containers to the label applicator drum 1. At the instant when a container makes contact with the label sticking drum 1, a label held by suction applied along the external surface of the label applicator drum 1 is urged against an external surface of the container. As a result, a label is transferred to the container and sticks on the external surface of the container. As will be explained later, the present invention is directed to the action by which a label is transferred from the label suction drum 2 to the label application drum 1.

A number of air passages 7 are provided in the label applicator drum 1. The air passages form air suction holes 11, at one end, on the cylindrical surface of the label applicator drum 1. At their other end, the air passages 7 form a series of openings 8 arranged on the undersurface of the label applicator drum 1. An air suction groove 12 is arranged along the upper surface of a bed plate 14 on which the label sticker drum 1 is rotatably supported. The air suction groove 12 abuts the locus of the series of openings 8. A vacuum pump (not shown) is connected with the air suction groove 12. The air suction groove 12 extends from a position close to the first one of the label suction drums 2 to a position close to the conveyor 4, as shown by broken lines in FIGS. 1 and 2. Therefore, as the label applicator drum 1 rotates, vacuum is applied selectively to a limited number of the air suction holes 11 as they pass over and along the air suction groove 12.

Figure 2:
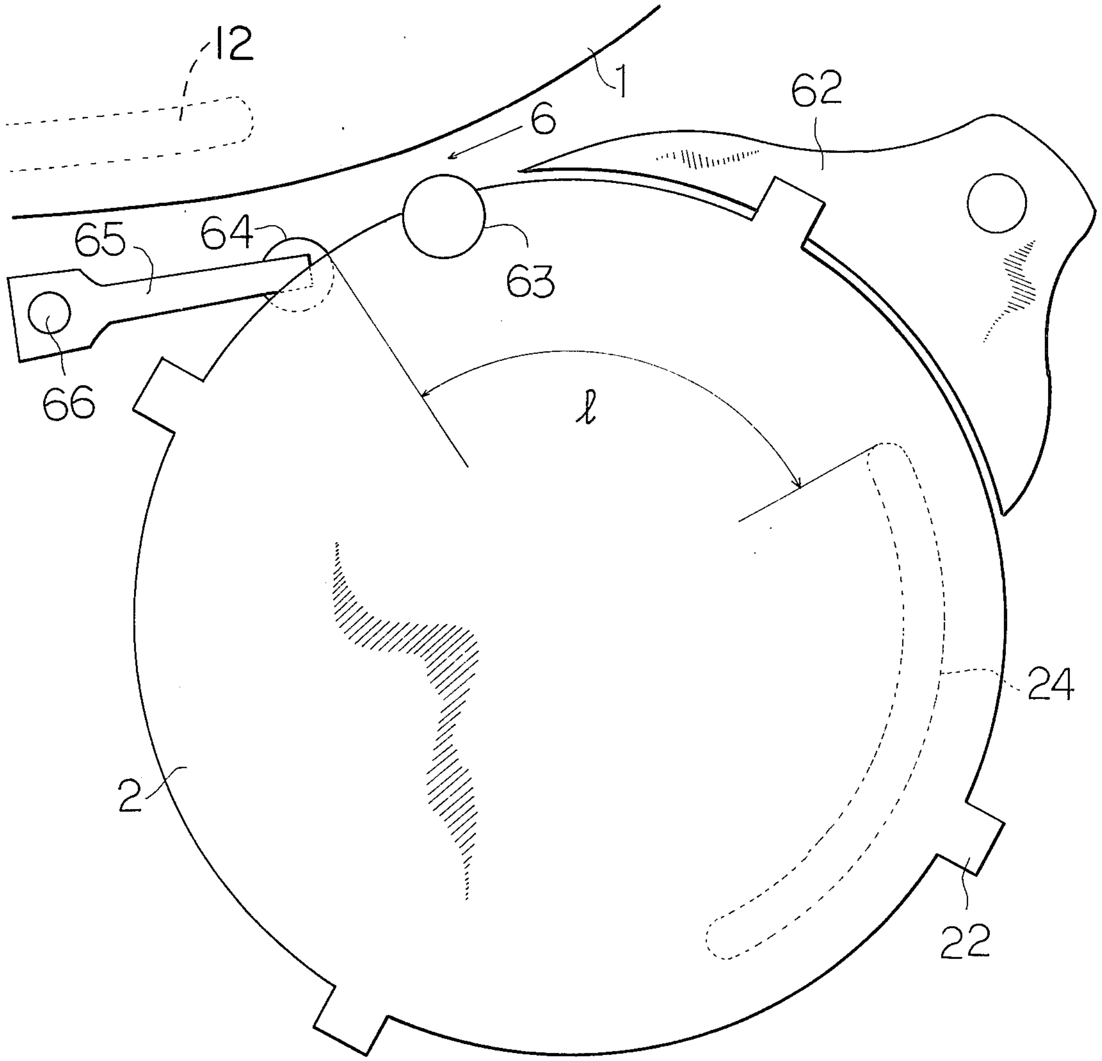
FIG. 2 is a plan view of the label suction drum illustrating its positioning relative to the label applicator drum.
Figure 3:
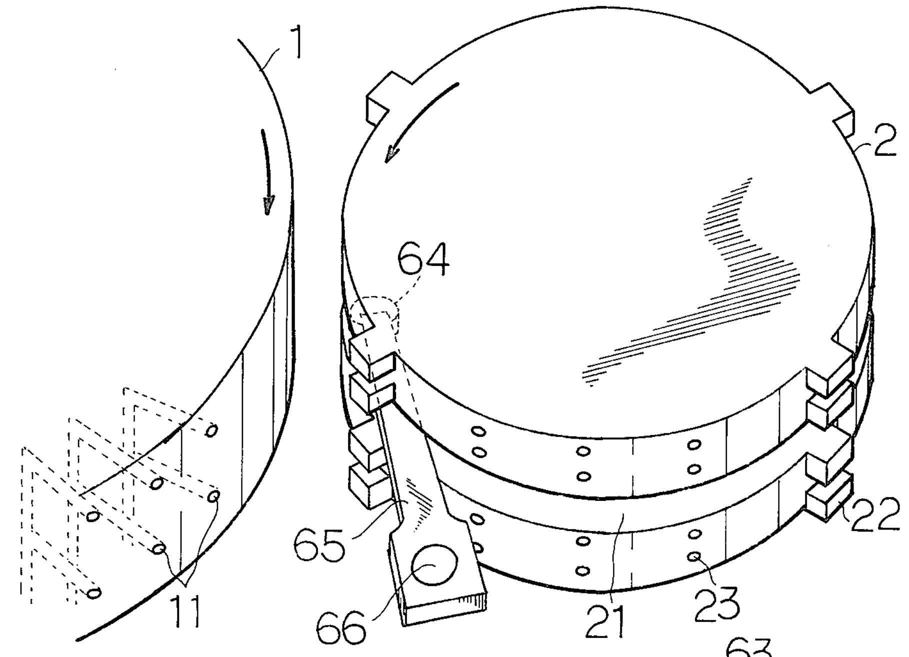
FIG. 3 is a perspective view of the label suction drum and a portion of the label applicator drum.
Figure 4:
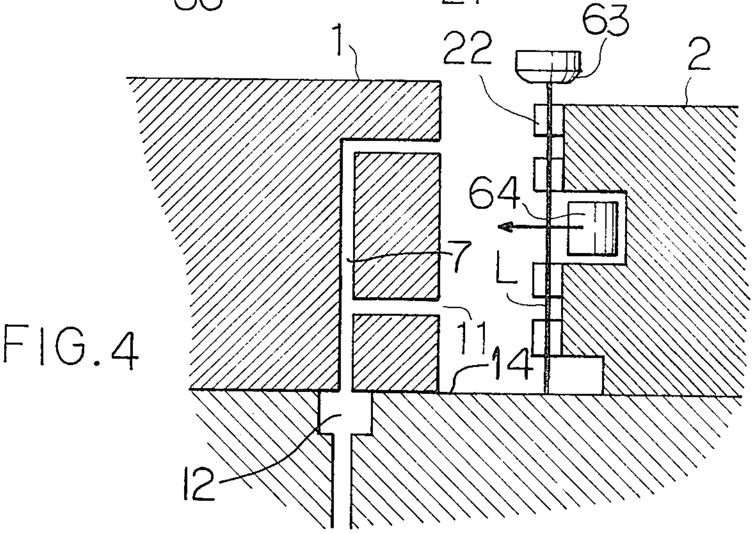
FIG. 4 is a vertical cross-sectional view of the label suction drum and a portion of the label applicator drum.
Figure 5:
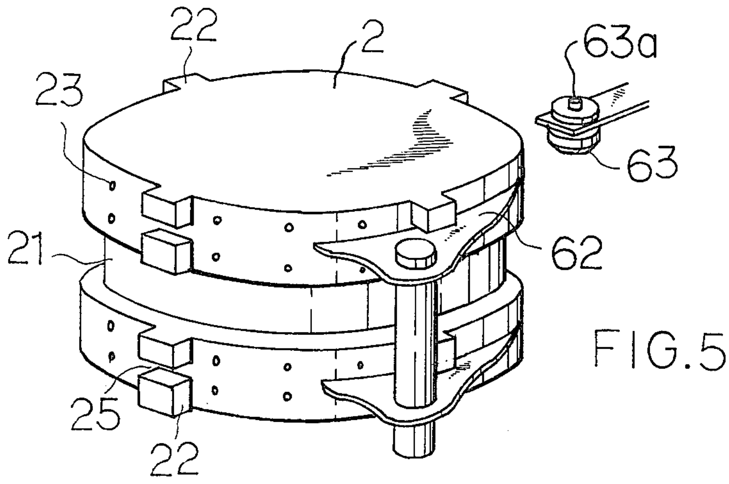
FIG. 5 is another perspective view of the label suction drum taken from a different position.
Figure 9:
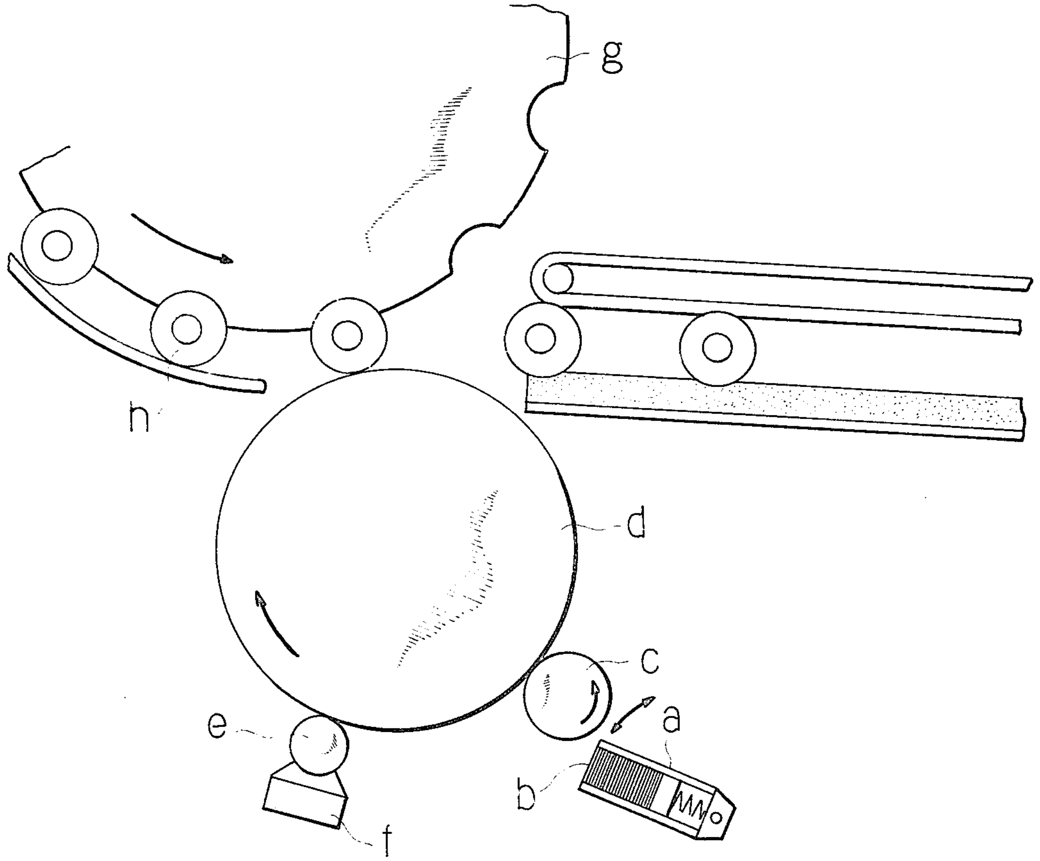
FIG. 9 is a plan view of a prior art labelling machine.

The label suction drums 2 rotate around respective vertical shafts. A plurality of label suction drums 2 are arranged around the label applicator drum 1 as shown in FIG. 1. The cylindrical external surface of the label suction drum 2 is split into upper and lower portions 2*a*, 2*b*, respectively, by a circular groove 21 formed at the center of the generation line thereof, as shown in FIGS. 3–8. Pairs of projections 22 are provided at uniform angular intervals on both the upper and lower halves 2*a*, 2*b* of the label suction drum 2. A non-projected cylindrical portion, or horizontal groove 25, separates each pair of projections 22 as shown in FIGS. 5–7.

A number of air suction holes 23 are arranged on the cylindrical surface of the label suction drum 2. Air passages penetrate the label suction drum 2, beginning at the air suction holes 23 and ending at the holes provided in the undersurface of of the bottom of the label suction drum 2. An air suction groove 24 is arranged along the upper surface of the bed plate 14, on which the label suction drum 2 rotates. The air suction groove 24 abuts the locus of the aforementioned holes provided in the undersurface of the bottom of the label suction drum 2. A vacuum pump (not shown) is connected with the air suction groove 24. The air suction groove 24 extends from a position close to the position where a label holder 3 approaches the air suction drum 2 to feed a label to a position which is in advance, by a distance L, of the position where the line connecting the centers of the label applicator drum 1 and the label suction drum 2 drosses the peripheral surface of the label suction drum 2. The distance L is selected to be slightly shorter than the length of a label to be stuck on a container.

A label transfer mechanism 6, the most essential portion of the present invention, transfers a label from the label suction drum 2 to the label applicator drum 1. The label transfer mechanism comprises a bed plate 61, a guide plate 62, an upper stopper 63, a push roller 64 and the aforementioned projections 22 of the label suction drum 2.

The bed plate 61 consists of a plate supported in a horizontal position along which each label moves, thereby taking an upright position and, as a result, there is no possibility of the labels deviating from a horizontal position.

The guide plate 62 consists of a plate positioned close to the cylindrical surface of the label suction drum 2 within the horizontal groove 25 provided between each pair of projections 22. While each label in an upright position is pushed at the rear end by the projections 22 along the guide plate 62, the guide plate 62 guides and supports the label. In an embodiment shown in FIGS. 5–8, an end of a plate held in a horizontal position is utilized as the guide plate 62. Due to the horizontal groove 25, the guide plate 62 can be positioned extremely close to the cylindrical surface of the label suction drum 2 without interfering with the projections 22 as shown in FIG. 6. The tail end of the guide plate 62 is located close to a position where the line connecting the centers of the label applicator drum 1 and the label suction drum 2 crosses the peripheral surface of the label suction drum 2. The guide plate 62 must have a length close to, or longer than, that of the label.

The upper stop 63 consists of a guide member supported over the bed plate 61 at approximately the same height as a label above the upper surface of the bed plate 61, and it will be convenient if vertical adjustment is permitted by means of a screw 63*a*. The upper stop 63 is located close to a position where the line connecting the centers of the label applicator drum 1 and the label suction drum 2 crosses the peripheral surface of the label suction drum 2, and contacts the upper edge of a label moving toward the label applicator drum 1. The upper stop 63 performs two independent functions, one of which is to correct any deviation in the label position from the horizontal position. The other is to retard the progress of a label moving at a relatively high speed.

The push roller 64 is positioned inside the circular groove 21 of the label suction drum 2. The location corresponds to the position where a line connecting the centers of the label applicator drum 1 and the label suction drum 2 crosses the peripheral surface of the label suction drum 2. The push roller 64 is rotatably supported at one end of a support arm 65, the other end of which is fixed by a vertical shaft 66.

The vertical shaft 66 rotates in alterate directions simultaneously with the label receiving action of the label applicator drum 1. In other words, it cyclically repeats a swinging motion between a position where the push roller 64 urges a label against the cylindrical surface of the label sticker drum 1 and a position where the push roller 64 is located inside the circular groove 21 of the label suction drum 2.

The operation of a labelling machine constructed in accordance with the present invention will now be described.

At the instant when the label holder 3 contacts the label suction drum 2, the latter takes a label L located at the extreme front of the former by means of suction applied through the air suction holes 23. The Label L is held along an arbitrary portion of the cylindrical surface between the projections 22. In other words, the label suction drum 2, in accordance with the present invention, does not require that a label be fed exactly in a specific time, as is required in the case of the prior art. When the label L held along the peripheral surface of the suction drum 2 has moved to face the guide plate 62, the label L is released from the label suction drum 2 because the passages provided in the under surface of the bottom of the label suction drum 2 have passed by the air suction groove 24 arranged along the upper surface of the bed plate, thereby discontinuing the application of vacuum to the label suction drum 2. In this instance, a space A still remains between the end of the label L and a group of projections 22 located behind the label L. Even after being released, the label L keeps moving due to the inertia and remaining vacuum until the upper stopper 63 reduces the speed of the label L by making contact with the same and corrects the positional deviation, if any, of the label L. Thereafter, the projections 22, having proceeded by the distance A, push the label L forward.

In this manner, while being supported or guided from three directions (that is, upwardly by the bed plate 61, forwardly by the projections 22 and downwardly by the upper stopper 63), the label L is pushed toward the label applicator drum 1 by the push roller 64 and is sucked by vacuum applied through the air suction holes 11 provided along the cylindrical surface of the label applicator drum 1.

A photo-detector, detecting the arrival of a label L, causes the paste applicator drum 5 to apply paste on the rear surface of a label L. Thereafter, a previously known type mechanism is utilized for applying a label L to a container.

Thus, each label L is first released from the label suction drum 2 before it is taken up again by the label applicator drum 1, at a time, detected by the photo-detector, convenient for the paste applicator drum E to apply paste to the label L.

As explained above, the present invention is characterized by the procedure in which a label L is held and carried by the label suction drum 2 once it is released to a free condition to have any positional deviation thereof corrected and, thereafter, is urged by the push roller 64 toward the label applicator drum 1 to be taken up again by the same. As a result, the present invention has the following advantages:

(1) Since there is no possibility of any single label being simultaneously sucked by both drums 1 and 2, the speed of both drums can be selected independently, each from the other. In other words, it is possible to transfer a label from a label suction drum 2, which is rotating at a relatively low speed, to a label applicator drum 1, which is rotating at a high speed, which will usually be several times as high as that of the label suction drum 2.

(2) Since a label once released from the label suction drum 2 is transferred to the label applicator drum 1 by the activity of a push roller 64 in response to the signal of a photo-detector which detects the progress of the label, it is not necessarily important for the label suction drum 2 to receive a label from the label holder 3 at a precise position. That is, even if the label suction drum 2 takes a label from a label holder at an irregular position, it is possible to cause the label applicator drum 1 to receive the label at a required precise position.

(3) A satisfactory positional correction is feasible for a label L by the activities of the bed plate 61 and the upper stopper 63. As a result, it is possible to apply labels in a precise, horizontal position on the external surface of a container.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than the foregoing description, and all changes which come within the meaning and range of the equivalency of the claims are to be embraced therein.

What is claimed:

1. A labelling machine comprising:

(a) a plurality of label suction drums rotatably mounted on a bedplate, each said label suction drum being provided with a plurality of arcuately spaced projections and vacuum suction outlets between said projections;

(b) a plurality of label holders for supplying labels one-by-one to a corresponding label suction drum, the labels being retained on a peripheral surface of said label suction drum between said projections by vacuum applied through said vacuum suction outlets;

(c) a label applicator drum positioned adjacent said label suction drums, the labels being held by said label suction drums being fed one-by-one to said label applicator drum to be thereafter applied to an object;

(d) an upper stop means positioned adjacent the periphery of each label suction drum and said label applicator drum, said upper stop means being spaced from said bedplate by a distance corresponding to the height of the labels, said upper stop means correcting any horizontal misalignment of the labels relative to said label suction drum; and (e) push means for urging the labels carried by said label suction drums towards said label applicator drum.

2. A labelling machine as claimed in claim 1 wherein said upper stop means is vertically adjustable.

3. A labelling machine as claimed in claim 1 further comprising control means for periodically applying vacuum to said label suction drum suction outlets, wherein said control means applies a vacuum to attract a label from said label holder and then turns off the vacuum as the label approaches said label applicator drum to permit correction of said label positioning by said upper stop means.

4. A labelling machine as claimed in claim 3 wherein said label suction drum projections are comprised of upper and lower pairs of projections with a horizontal groove separating each of said upper and lower pairs of projections, and guide means being positioned in said horizontal grooves for maintaining the labels against the label suction drum surface after said control means turns off the vacuum.

* * * * *